US011994143B2

(12) United States Patent
Nimma et al.

(10) Patent No.: US 11,994,143 B2
(45) Date of Patent: May 28, 2024

(54) MONOLITHIC ROTOR AND COMPRESSOR WHEEL

(71) Applicant: BLADON JETS HOLDINGS LIMITED, Castletown (IM)

(72) Inventors: Vasudeva Nimma, Warwick (GB); Phillip Heward, Warwick (GB); Stephen Pye, Warwick (GB)

(73) Assignee: BLADON JETS HOLDINGS LIMITED, Castletown (IM)

( * ) Notice: Subject to any disclaimer, the term of this patent is extended or adjusted under 35 U.S.C. 154(b) by 74 days.

(21) Appl. No.: 17/791,865

(22) PCT Filed: Jan. 13, 2020

(86) PCT No.: PCT/EP2020/050732
§ 371 (c)(1),
(2) Date: Jul. 8, 2022

(87) PCT Pub. No.: WO2021/144002
PCT Pub. Date: Jul. 22, 2021

(65) Prior Publication Data

US 2023/0041460 A1 Feb. 9, 2023

(51) Int. Cl.

| | |
|---|---|
| ***F04D 29/054*** | (2006.01) |
| ***F01D 5/34*** | (2006.01) |
| ***F04D 17/10*** | (2006.01) |
| ***F04D 29/04*** | (2006.01) |
| ***F04D 29/046*** | (2006.01) |

(Continued)

(52) U.S. Cl.
CPC ............. *F04D 29/266* (2013.01); *F01D 5/34* (2013.01); *F04D 17/10* (2013.01); *F04D 29/04* (2013.01); *F04D 29/046* (2013.01); *F04D 29/051* (2013.01); *F04D 29/052* (2013.01); *F04D 29/053* (2013.01); *F04D 29/054* (2013.01);
(Continued)

(58) Field of Classification Search
CPC .... F04D 29/054; F04D 29/053; F04D 29/052; F04D 29/04; F04D 29/051; F04D 29/041; F04D 29/056; F04D 29/046; F01D 5/34; F05D 2230/53
See application file for complete search history.

(56) References Cited

U.S. PATENT DOCUMENTS

| | | | | |
|---|---|---|---|---|
| 3,809,493 A | | 5/1974 | Pilarczyk | |
| 4,659,245 A | * | 4/1987 | Hirao | F16D 1/068 403/30 |

(Continued)

FOREIGN PATENT DOCUMENTS

| | | |
|---|---|---|
| CN | 109139264 A | 1/2019 |
| KR | 20130092277 A | 8/2013 |

OTHER PUBLICATIONS

Nimma, V., et al., PCT/EP2020/050732, International Search Report, Sep. 11, 2020, 4 pages.

(Continued)

*Primary Examiner* — Courtney D Heinle
*Assistant Examiner* — Andrew J Marien
(74) *Attorney, Agent, or Firm* — Rahman LLC

(57) ABSTRACT

A rotational component includes a monolithic compressor component for rotation about a rotor axis defining proximal and distal directions, the monolithic compressor component including a compressor shaft defining a rotor core and a compressor wheel disposed distally from the rotor core.

20 Claims, 4 Drawing Sheets

(51) Int. Cl.
*F04D 29/051* (2006.01)
*F04D 29/052* (2006.01)
*F04D 29/053* (2006.01)
*F04D 29/056* (2006.01)
*F04D 29/26* (2006.01)

(52) U.S. Cl.
CPC ........ *F04D 29/056* (2013.01); *F05D 2230/53* (2013.01)

(56) References Cited

U.S. PATENT DOCUMENTS

| | | | | |
|---|---|---|---|---|
| 5,964,663 A * | 10/1999 | Stewart | F01D 5/048 | 464/182 |
| 6,265,786 B1 * | 7/2001 | Bosley | F02C 9/56 | 290/46 |
| 6,998,756 B2 * | 2/2006 | Ishii | F01D 5/026 | 310/90 |
| 8,438,858 B1 * | 5/2013 | Jones | F01D 11/003 | 60/804 |
| 10,774,649 B2 * | 9/2020 | Taguchi | F02C 7/06 | |
| 11,125,103 B2 * | 9/2021 | Carpenter | F01D 15/10 | |
| 2003/0215323 A1 * | 11/2003 | Prinz | F04D 29/052 | 415/173.2 |
| 2005/0089392 A1 * | 4/2005 | Lubell | F01D 25/22 | 415/104 |
| 2016/0195017 A1 * | 7/2016 | Vick | F02C 7/08 | 60/39.511 |
| 2018/0030988 A1 * | 2/2018 | Garrard | F04D 25/04 | |
| 2019/0024511 A1 | 1/2019 | Taguchi et al. | | |

OTHER PUBLICATIONS

Nimma, V., et al., PCT/EP2020/050732, Written Opinion, Sep. 11, 2020, 7 pages.

* cited by examiner

MONOLITHIC ROTOR AND COMPRESSOR WHEEL

TECHNICAL FIELD

The subject matter disclosed herein relates generally to a rotational component comprising a monolithic rotor and compressor wheel, in particular a rotational component suitable for a microturbine and/or an air compressor, and a method of manufacture of a rotational component comprising a monolithic rotor and compressor wheel.

BACKGROUND

Microturbines are gas turbines providing a maximum power output of up to 100 kilowatts and employing revolutions per minute ranging between 70,000 and 140,000 at maximum power.

Microturbines may be utilized in distributed energy resources and employ a compressor, combustor, turbine and electric generator to convert fuel into a local source of electric power. Their small footprint, high rotational speeds and high operating temperatures present significant design challenges.

Prior art microturbine implementations employ a first magnetic rotor in the vicinity of the electric generator and a second power rotor in the vicinity of the compressor and turbine with a flexible coupling between these first and second rotors, the flexible coupling arranged to transmit torque between the first and second rotors, without transmitting radial excursions or bending moments between the first and second rotors. Such flexible couplings are fragile and prone to break.

The presence of the flexible coupling complicates design and reduces reliability of a microturbine implementation. And yet particularly in the context of power generation, reliability is of paramount importance.

Whereas a microturbine employs an electric generator to convert fuel into electric power, in which case a magnetic rotor forms part of an electric generator, an air compressor converts electric power into potential energy stored in pressurized air, in which case a magnetic rotor forms part of an electric motor.

As in the case of prior art microturbine implementation, prior art air compressor implementations employ a coupling between the magnetic rotor and the compressor wheel, leading to complications in design and reduced reliability owing to the introduction of further failure modes.

It is therefore desirable to provide a rotational component for a microturbine and/or an air compressor resolving one or more of the above-described deficiencies in existing designs.

BRIEF DESCRIPTION OF THE DRAWINGS

Disclosed arrangements are further described hereinafter by way of example and with reference to the accompanying drawings, in which.

DETAILED DESCRIPTION

Figure 1:
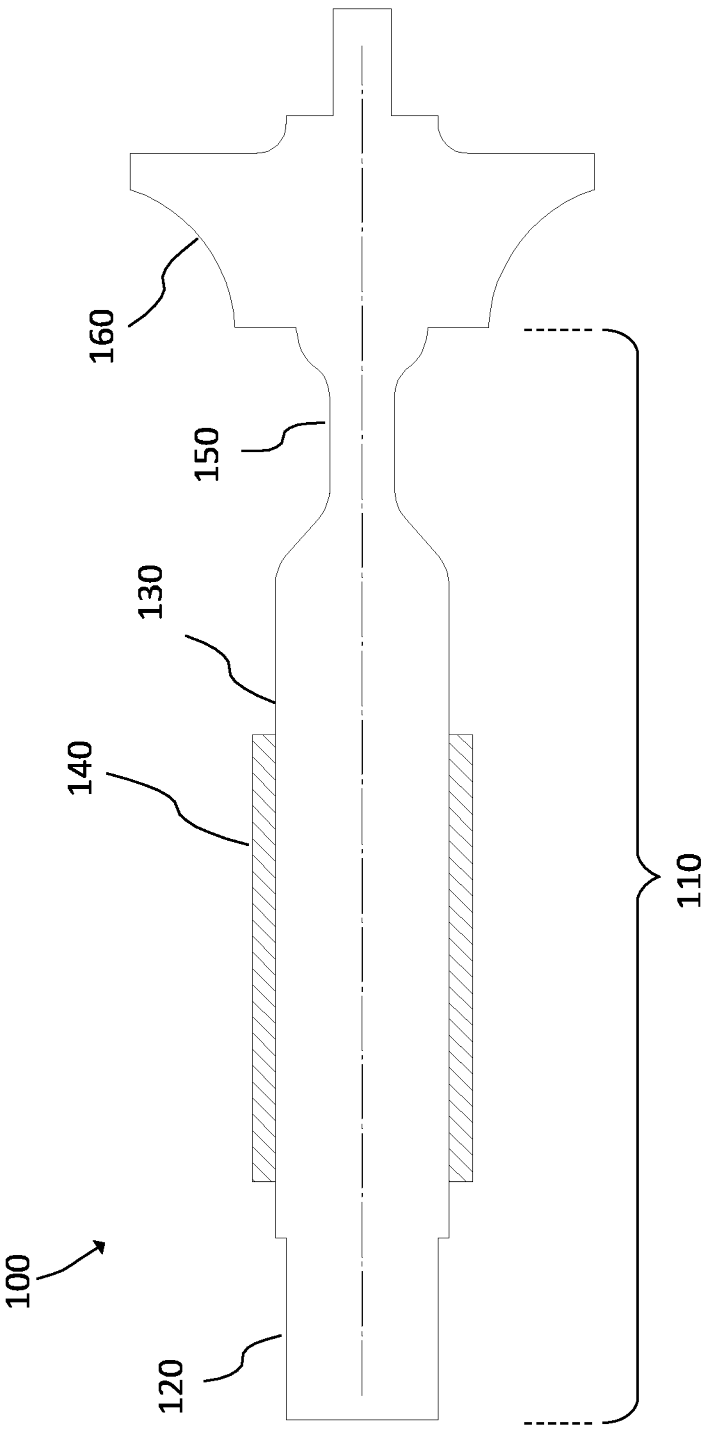
FIG. 1 depicts an example of a rotational component for a microturbine comprising a monolithic compressor component.

FIG. 1 depicts a rotational component for rotation about a rotor axis defining proximal and distal directions. In the figures of the present application, the proximal direction extends to the left and the distal direction extends to the right. The rotational component may be suitable for use in a microturbine and/or an air compressor.

The rotational component comprises a monolithic compressor component 100 comprising a compressor shaft 110 defining a rotor core 130, which rotor core 130 may be cylindrical, and an integrally formed compressor wheel 160 disposed distally from the rotor core.

As used herein a rotor core may be the rotor core of a magnetic rotor.

As used herein a monolithic component is a continuous component formed or composed of material without discontinuous joints or seams. The monolithic components disclosed herein may comprise a single material or may comprise more than one material. For example, two segments of the same material or two segments of different material may be welded together to provide a continuous joint, resulting in a monolithic component. Alternatively an additive or subtractive manufacturing process could be employed in order to form the monolithic component from a single material or from more than one material.

The rotor core 130 may be cylindrical and/or magnetic. The rotor core 130 may form part of a magnetic rotor comprising or providing a permanent magnet. In the example depicted in FIG. 1, a sleeve 140 incorporating a permanent magnet is provided. However other forms of permanent magnet may be imparted to the rotor core 130 to provide a magnetic rotor. For example, one or more permanent magnets could be embedded into one or more sockets in the rotor 130.

The rotor core 130 may be suitable for use in a generator or an electric motor. Thus the monolithic compressor may be used in a microturbine for generating power. Alternatively, as discussed below, the monolithic compressor may be used in an electrically driven air compressor.

The radius of the rotor core 130 may be substantially between 10 and 18 mm. The radius of the compressor wheel may be substantially between 25 and 40 mm.

As shown in the example depicted in FIG. 1, the compressor shaft 110 may comprise sections having different radii with step changes or tapered changes therebetween.

As shown in the FIG. 1 example, the monolithic compressor component 100 may comprise at a proximal end thereof a proximal radial bearing rotor 120 defined by the compressor shaft 110.

The monolithic compressor component 100 may comprise a neck 150 comprising a radius that is less than the radius of the rotor core 130. The neck 150 may be cylindrical. The compressor shaft 110 may define a cylindrical neck 150 connected via a proximal tapered region interconnecting the rotor core 130 and the cylindrical neck 150 and/or the compressor shaft 110 may define a distal tapered region interconnecting the cylindrical neck 150 and the compressor wheel 160.

The present inventors have discovered that the provision in this location of a reduced radius neck region 150 such as is depicted in the specific example of FIG. 1 facilitates tuning of the frequency response characteristics of the rotational component in use and replacement of a flexible coupling with the monolithic structure for the combined rotor and compressor assembly as contemplated in the present disclosure.

The neck 150, having a radius profile less than the radius of the magnetic rotor 130, facilitates tuning the natural frequency of the rotational component outside of the operational range of revolutions per minute of the rotational component thereby to provide enhanced rotational stability and performance characteristics. For example, the radius profile of the neck 150 may be arranged such that the natural frequency of the rotational component is less than 666 Hz and greater than 2666 Hz. Advantageously this safeguards against resonances occurring within the operational range of the rotational component within a microturbine application offering improved stability characteristics. The natural frequency characteristics may be measured using acoustic resonance testing such as is described in Hertlin, Ingolf. "Acoustic Resonance Testing: the upcoming volume-oriented NDT method" (2003), the content of which is incorporated herein by reference in its entirety.

The neck 150 may be cylindrical having an axial length substantially between 10 mm and 25 mm, more preferably between 15.5 and 17.5 mm, with a radius substantially between 4 and 5 mm. Most preferably, the axial length may be substantially 16.5 mm and the radius substantially 4.5 mm. These geometric conditions have been identified as providing improved performance and stability characteristics.

With the neck 150 geometry dimensioned within this range the monolithic compressor component is particularly suited to application in a microturbine context exhibiting revolutions per minute spanning 40,000 and 160,000.

Figure 2:
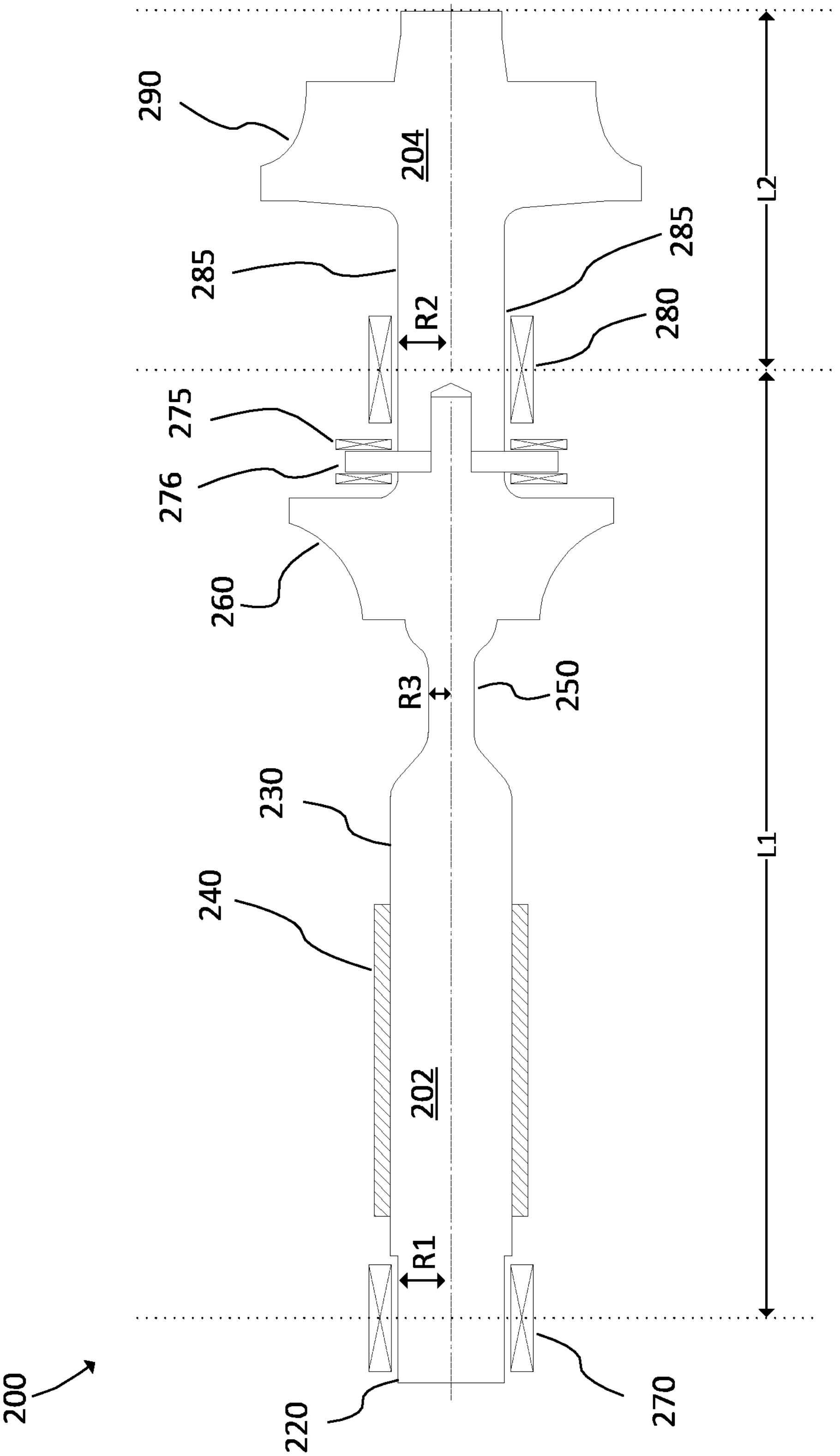
FIG. 2 depicts a first example of a rotor and bearing system comprising a monolithic compressor component and a monolithic turbine component.

FIG. 2 depicts an example of a rotor and bearing system 200 comprising a monolithic compressor component 202 as described above, and a monolithic turbine component 204.

It will be identified that just as the monolithic compressor component comprises a compressor shaft and integrally formed compressor wheel 260 disposed distally from the compressor shaft, the turbine component 204 comprises a turbine shaft 285 and integrally formed turbine wheel 290 disposed distally from the turbine shaft 285.

As shown in the example of FIG. 2, the monolithic compressor component 202 may be coupled with the monolithic turbine component 204 to form a rigid rotational component. In particular, the distal end of the monolithic compressor component 202 may be coupled to the proximal end of the monolithic turbine component 204. The monolithic compressor component 202 may comprise a male coupling member at the distal end thereof, and the monolithic turbine component 204 may comprise a female coupling member at a proximal end thereof, the male coupling member arranged to mate with the female coupling member to provide a rigid connection between the monolithic compressor component 202 and the monolithic turbine component 204. The male coupling member comprises a distally extending protrusion and the female coupling member comprises a distally extending cavity for receiving the distally extending protrusion.

In the specific example shown in FIG. 2, the monolithic compressor component 202 comprises a pin at a distal end thereof to be retained within a socket provided in the proximal end of the monolithic turbine component 204. The male and female coupling members may employ a screw-threaded connection. Alternatively the male and female coupling members may employ a friction fit or an alternative rigid connection.

As shown in FIG. 2, employing a male and female coupling between the monolithic compressor component 202 and the monolithic turbine component 204 facilitates clamping a thrust bearing disk 276 therebetween.

The rotor and bearing system example depicted in FIG. 2 employs a proximal radial bearing 270 within which extends a cylindrical proximal radial bearing rotor 220 defined by the shaft of the compressor component 202. The proximal radial bearing 270 in this example is disposed proximally of the cylindrical magnetic rotor 230.

The radius of the proximal radial bearing rotor 220 may substantially correspond with the radius of the rotor core 230.

Neck region 250 is shown between rotor core 230 and compressor wheel 260.

There is also shown in FIG. 2 a thrust bearing 275 within which may extend thrust bearing disk 276, which thrust bearing disk 276 is clamped between the monolithic rotor component 202 and monolithic turbine component 204. Thrust bearing 275 is disposed between the compressor wheel 260 and the turbine wheel 290. Disposed between the thrust bearing 275 and the turbine wheel 290 is a distal radial bearing 280 within which extends a distal radial bearing rotor 285 defined by the shaft of the monolithic turbine component 204.

Preferably the ratio between the length between the axial centers of the proximal radial bearing 270 and the distal radial bearing 280, depicted as L1 in FIG. 2, and the radius of the proximal radial bearing rotor 220, depicted as R1 in FIG. 2, i.e. L1/R1, is between 14 and 20. The radius of the proximal radial bearing rotor 220 may be substantially the same as the radius of the distal radial bearing rotor 285.

Preferably in this example the ratio between the axial length between the center of the distal radial bearing 280 and the distal end of the monolithic turbine component 204, depicted in FIG. 2 as L2, and the radius of the distal radial bearing rotor 285, depicted in FIG. 2 as R2, i.e. L2/R2 is less than or equal to 7. This offers improved stability by preventing excess load on the radial bearings.

The placement of the proximal radial bearing 270 at the proximal end of the rotor and bearing system 200 facilitates utilization of a proximal radial bearing rotor having a radius that is substantially the same as that of the distal radial bearing and the proximal radial bearing may then be slid over the proximal end of the monolithic compressor component 202.

For the monolithic turbine component disclosed herein, it has been identified that the provision of an internal cavity in the turbine shaft 285 distal of the distal radial bearing 280, which internal cavity may extend from the axis of the turbine shaft to an internal radius of the turbine shaft 285, facilitates improved resistance to proximal heat propagation from the turbine wheel. The internal cavity may be disposed at an interface between the turbine shaft 285 and the turbine wheel 290.

Figure 3:
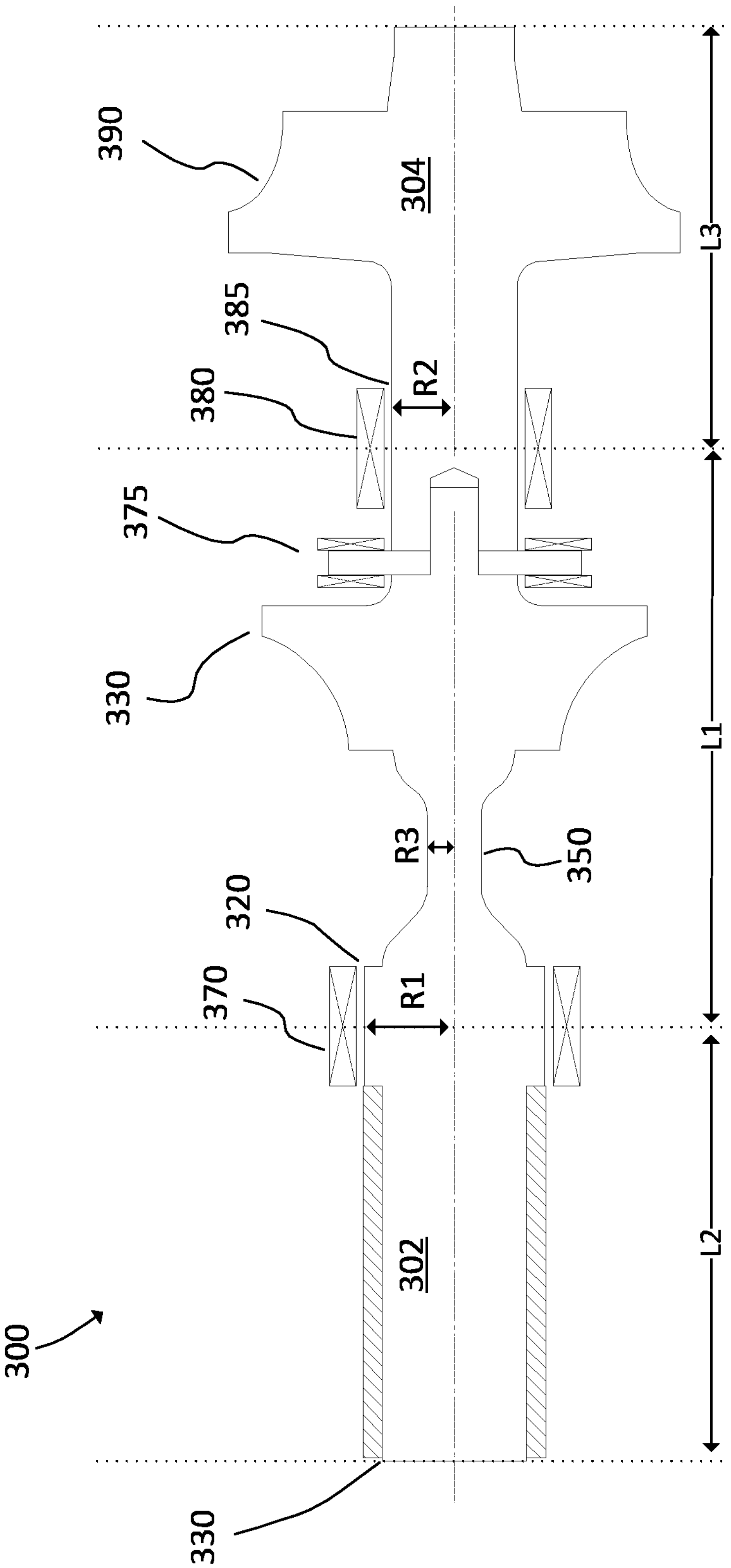
FIG. 3 depicts a second example of a rotor and bearing system comprising a monolithic compressor component and a monolithic turbine component.

FIG. 3 depicts another example of a rotor and bearing system 300. According to this example, the proximal radial bearing 370 is disposed distally from the rotor core 330 of the monolithic compressor component 302.

Preferably in this example the ratio between the radius of the proximal bearing rotor 320, depicted as R1 in FIG. 3, and the radius of the distal radial bearing rotor 385, depicted as R2 in FIG. 3, i.e. R1/R2, is substantially between 1 and 1.5, e.g. substantially between 1.1 and 1.4.

In this example the ratio between the length between the axial centers of the proximal radial bearing 370 and the distal radial bearing 380, depicted as L1 in FIG. 3, and the radius of the distal radial bearing rotor 385, depicted as R2 in FIG. 3, i.e. L1/R2, is substantially between 6 and 9. In this example the ratio between the axial length between the proximal end of the compressor component 302 and the axial center of the proximal radial bearing 370, depicted as L2 in FIG. 3, and the radius of the distal radial bearing rotor 385, depicted as R2 in FIG. 3, i.e. L2/R2, is less than or equal to 7.

In this example the ratio between the axial length between the center of the distal radial bearing 380 and the distal end of the monolithic turbine component 304, depicted in FIG. 3 as L3, and the radius of the distal radial bearing rotor 385, depicted in FIG. 3 as R2, i.e. L3/R2, is less than or equal to 7. This offers improved stability by preventing excess load on the radial bearings.

For the rotor and bearing systems disclosed herein, the ratio between the radius of the neck 250 or 350, depicted as R3 in FIGS. 2 and 3, and the radius of the distal radial bearing rotor 285, 385, depicted as R2 in FIGS. 2 and 3, i.e. R3/R2, may be substantially between 0.35 and 0.45. Furthermore, the total length of the rotational component may be between 265 and 285 mm. The ratio between the total length and the radius of the distal radial bearing, i.e. total length/R2, may be between 25 and 26. These geometrical relationships have been identified as proving superior performance and stability characteristics over the operating ranges present in a microturbine.

Thus there is disclosed herein a rotor and bearing system comprising a magnetic rotor, a compressor wheel and a turbine wheel, without comprising a flexible coupling.

A microturbine or gas turbine may comprise any of the rotational component or rotor and bearing system configurations disclosed herein. By dispensing with the requirement for a flexible coupling, reliability and performance characteristics may be improved, which is of particular benefit in power generation applications having particular sensitivity to reliability.

There is also disclosed herein an air compressor comprising the any one of the monolithic compressor component embodiments disclosed herein. According to this example, the air compressor may comprise a motor stator for receiving the magnetic rotor, a compressor wheel housing, a thrust bearing and proximal and distal radial bearings for supporting the compressor component.

The use of such a monolithic compressor component in an air compressor facilitates a greatly simplified design and improved reliability owing to fewer failure modes.

Figure 4:
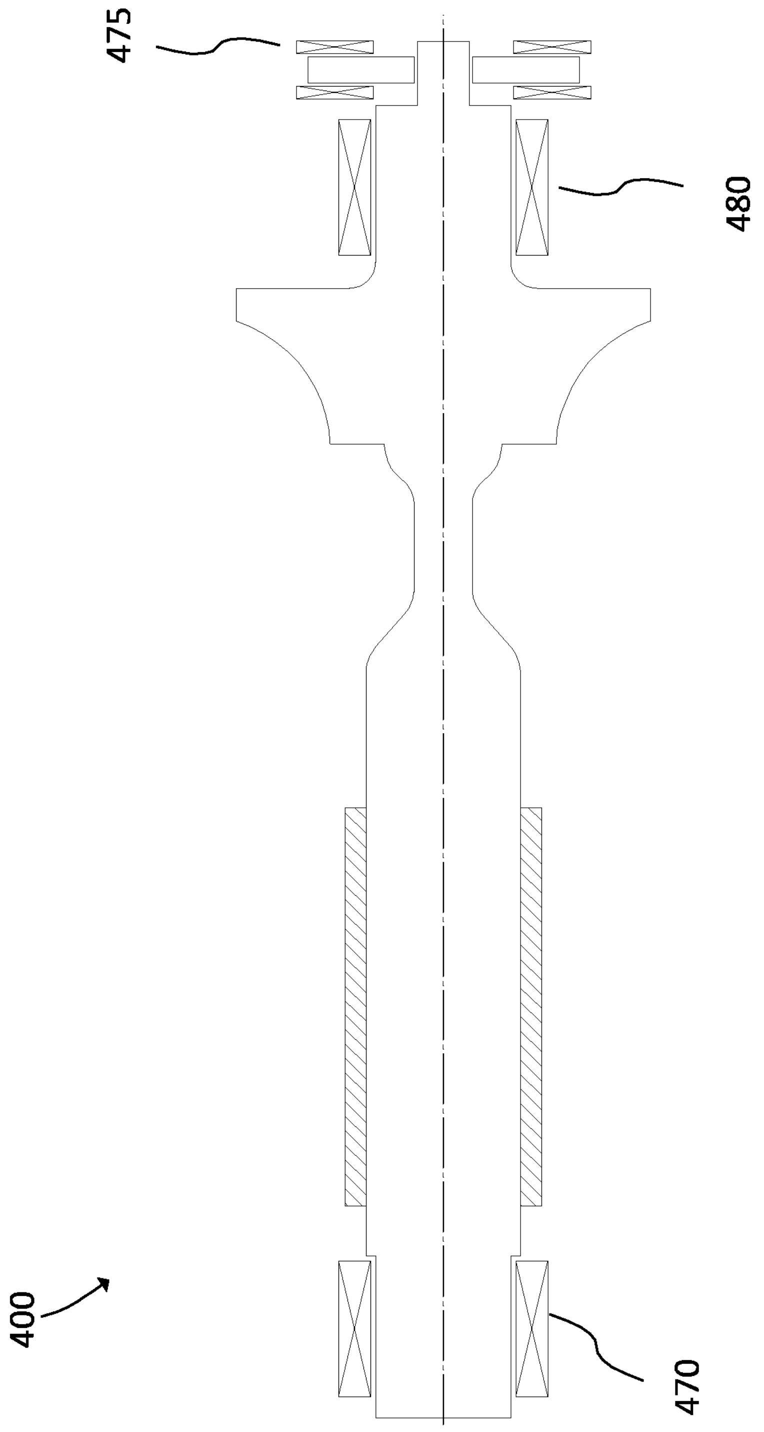
FIG. 4 depicts a third example of a rotor and bearing system comprising a monolithic compressor component.

FIG. 4 depicts a rotor and bearing system 400 comprising a proximal radial bearing 470, a distal radial bearing 480 and a thrust bearing 475. Thus there is disclosed herein a rotor and bearing system 400 comprising a monolithic compressor component comprising a rotor core and integrally formed compressor wheel, optionally further comprising a neck region therebetween such as is described above. The monolithic compressor component may comprise an integrally formed distal shaft extending distally from the compressor wheel. The rotor core may provide the rotor core of a magnetic rotor. The proximal radial bearing 470 may be disposed at the proximal end of the monolithic compressor component and a proximal compressor shaft of the compressor component may extend within the proximal radial bearing 470. The thrust bearing 475 may be disposed distally from the compressor wheel and the distal shaft of the compressor component may extend within the thrust bearing 475. The distal radial bearing 480 may be disposed between the compressor wheel and the thrust bearing 475. This example is suitable for use in an air compressor.

In accordance with another aspect, there is disclosed herein a method of manufacturing a monolithic compressor component comprising welding proximal and distal segments together thereby to form a monolithic compressor component comprising a proximal rotor, which may be rendered magnetic, and a compressor wheel distally disposed from the proximal rotor.

The method may comprise welding at a neck region of the monolithic compressor component the proximal and distal segments together. This facilitates simplified manufacturing.

Each of the examples disclosed herein, including the claimed examples, may be provided in a gas turbine system, e.g. a micro turbine system, or an air compressor, comprising the rotational component or rotor and bearing system.

Each of the examples disclosed herein, including the claimed examples, may be suitable for a microturbine. Thus the claimed rotational component or rotor and bearing system may be suitable for a microturbine.

Each of the examples disclosed herein, including the claimed examples, may be suitable for an air compressor. Thus the claimed rotational component or rotor and bearing system may be suitable for an air compressor.

It will be recognized that the examples disclosed herein are not limiting and are capable of numerous modifications and substitutions.

What is claimed is:

1. A rotational component comprising:
- a monolithic compressor component for rotation about a rotor axis defining proximal and distal directions, the monolithic compressor component comprising a compressor shaft defining a rotor core, a compressor wheel disposed distally from the rotor core, and a neck disposed between the rotor core and the compressor wheel, wherein the rotor core connects to the compressor wheel through a welded connection at the neck.

2. The rotational component according to claim 1, wherein:
- a radius of the neck being less than a radius of the rotor core.

3. The rotational component according to claim 2, wherein:
- an axial length of the neck is between 10 and 25 mm; and
- a minimum radius of the neck is between 4 and 5 mm.

4. The rotational component according to claim 1, wherein:
- a radius of the rotor core is between 10 and 18 mm.

5. The rotational component according to claim 1, comprising:
- a monolithic turbine component for rotation about the rotor axis, the monolithic turbine component comprising a turbine shaft and a turbine wheel disposed distally from the turbine shaft, wherein:
  - the turbine shaft comprises a proximal end with a female coupling member; and
  - the compressor component comprises a distal end with a male coupling member that is arranged to mate with the female coupling member.

6. The rotational component according to claim 5, wherein:
- the male coupling member and the female coupling member mate via a screw-threaded connection.

7. The rotational component according to claim 5, wherein:
- the turbine shaft comprises an internal cavity proximate the to a distal end of the turbine shaft.

8. The rotational component according to claim 1, wherein the neck is cylindrical.

9. A microturbine rotor and bearing system, comprising:
- a monolithic compressor component for rotation about a rotor axis defining proximal and distal directions, the monolithic compressor component comprising a compressor shaft defining a rotor core, a compressor wheel disposed distally from the rotor core, and a neck disposed between the rotor core and the compressor wheel, wherein the rotor core connects to the compressor wheel through a welded connection at the neck;
- a monolithic turbine component for rotation about the rotor axis, the monolithic turbine component comprising a turbine shaft and a turbine wheel disposed distally from the turbine shaft, wherein:
  - the turbine shaft comprises a proximal end with a female coupling member; and
  - the compressor component comprises a distal end with a male coupling member that is arranged to mate with the female coupling member;
- a proximal radial bearing disposed proximally from the compressor wheel within which extends a cylindrical proximal radial bearing rotor defined by the compressor shaft, a radius of the proximal radial bearing rotor being equal to a radius of the rotor core;
- a distal radial bearing disposed between the compressor wheel and the turbine wheel within which extends a distal radial bearing rotor defined by the turbine shaft; and
- a thrust bearing disposed between the compressor wheel and the distal radial bearing.

10. The microturbine rotor and bearing system according to claim 9, wherein:
- a radius of the proximal radial bearing rotor is the same as a radius of the distal radial bearing rotor.

11. The microturbine rotor and bearing system according to claim 9, wherein:
- the proximal radial bearing is disposed proximally from the rotor core at a proximal end of the compressor component.

12. The microturbine rotor and bearing system according to claim 11, wherein:
- a ratio between an axial length between axial centers of the proximal and distal radial bearings and the radius of the proximal radial bearing rotor is between 14 and 20.

13. The microturbine rotor and bearing system according to claim 12, wherein:
- a ratio between an axial length between an axial center of the distal radial bearing and a distal end of the turbine component and a radius of the distal radial bearing rotor is less than or equal to 7.

14. The microturbine rotor and bearing system according to claim 9, wherein:
- a ratio between the radius of the proximal radial bearing rotor and a radius of the distal radial bearing rotor is between 1 and 1.5.

15. The microturbine rotor and bearing system according to claim 14, wherein:
- a ratio between an axial length between axial centers of the proximal and distal bearings and a radius of the distal radial bearing rotor is between 6 to 9.

16. The microturbine rotor and bearing system according to claim 14, wherein:
- a ratio between an axial length between a proximal end of the compressor component and an axial center of the proximal radial bearing and a radius of the distal radial bearing rotor is less than or equal to 7.

17. The microturbine rotor and bearing system according to claim 14, wherein:
- a ratio between a minimum radius of the compressor component and a radius of the distal radial bearing rotor is between 0.35 and 0.45.

18. A method of manufacturing a rotational component for rotation about a rotor axis defining proximal and distal directions, the method comprising:
- providing a rotor core;
- providing a compressor wheel that is disposed distally from the rotor core; and
- welding the rotor core and the compressor wheel together thereby to form a monolithic compressor component comprising the rotor core and the compressor wheel disposed distally from the rotor core, wherein the monolithic compressor component comprises a neck, and wherein the rotor core and the compressor wheel are welded together at the neck.

19. The method according to claim 18, wherein:
- the welding comprises electron beam welding and/or friction welding.

20. The method according to claim 18, comprising:
- disposing a distal compressor shaft, of the rotational component, distally from the compressor wheel;
- disposing a proximal radial bearing proximally from the compressor wheel within which extends a cylindrical proximal radial bearing rotor defined by the distal compressor shaft;
- disposing a distal radial bearing distally from the compressor wheel within which extends a distal radial bearing rotor defined by the distal compressor shaft; and
- disposing a thrust bearing distally from the distal radial bearing.

* * * * *